(12) United States Patent
Statnikov (10) Patent No.: US 6,458,225 B1
(45) Date of Patent: Oct. 1, 2002

(54) ULTRASONIC MACHINING AND RECONFIGURATION OF BRAKING SURFACES

(75) Inventor: Efim S. Statnikov, Birmingham, AL (US)

(73) Assignee: Uit, L.L.C. Company, Irondale, AL (US)

(*) Notice: Subject to any disclaimer, the term of this patent is extended or adjusted under 35 U.S.C. 154(b) by 0 days.

(21) Appl. No.: 09/653,987

(22) Filed: Sep. 1, 2000

Related U.S. Application Data (63) Continuation-in-part of application No. 09/288,020, filed on Apr. 8, 1999, now Pat. No. 6,338,765, which is a continuation-in-part of application No. 09/145,992, filed on Sep. 3, 1998, now Pat. No. 6,171,415.

(51) Int. Cl.$^7$ ............................................... C21D 10/00
(52) U.S. Cl. ...................................... 148/558; 188/73.1
(58) Field of Search .......................... 148/558; 188/73.1

(56) References Cited

U.S. PATENT DOCUMENTS

| | | | |
|---|---|---|---|
| 3,274,033 A | | 9/1966 | Jacke |
| 4,453,392 A | * | 6/1984 | Klubovich et al. ........... 72/710 |
| 5,193,375 A | | 3/1993 | Meister |
| 5,352,305 A | | 10/1994 | Hester |
| 5,664,648 A | | 9/1997 | Hester |
| 6,171,415 B1 | * | 1/2001 | Statnikov ................... 148/525 |

FOREIGN PATENT DOCUMENTS

| | | |
|---|---|---|
| FR | 2 662 180 A1 | 11/1991 |
| RU | 1447646 | 12/1988 |
| RU | 1698041 | * 12/1991 |
| WO | 93/20247 | * 10/1993 |

OTHER PUBLICATIONS

International Institute of Welding Document XIII–1609–95 entitled "Ultrasonic Impact Treatment of Welded Joints" by V.I. Trufyakov et al (1995).
International Institute of Welding Document XIII–1617–96 entitled "Specification for Weld Toe Improvement by Ultrasonic Impact Treatment" by E.S. Statnikov et al (1996).

\* cited by examiner

*Primary Examiner*—George Wyszomierski
(74) *Attorney, Agent, or Firm*—Breiner & Breiner, L.L.C.

(57) ABSTRACT

The novel methods, apparatus and reworked rotary braking surface product, for example those exhibited on interior cylindrical braking surfaces of a cast iron brake drum, serve to replace manufacturing defects exhibiting residual tensile stresses and outwardly directed tool marks with smooth compressed braking surfaces in a final manufacturing stage. The plastically deformed surface shape with reduced roughness and surface irregularities furthermore presents improved braking strength above the yield point and approaching the ultimate material strength of the base drum material. An ultrasonic transducer drives individual freely moving impact elements of a set at frequencies up to 55 kHz into the braking surface to effect plastic deformation at surface and sub-surface layers. Physically, the small sized ultrasonic transducer is inserted into a drum cylinder and driven by a lathe producing relative motion between the braking surface and the ultrasonically vibrating impact elements scanning only the braking surface in a readily controlled ultrasonic impact machining cycle for attaining specified braking surface performance.

19 Claims, 3 Drawing Sheets

ULTRASONIC MACHINING AND RECONFIGURATION OF BRAKING SURFACES

RELATED APPLICATIONS

This application is a continuation-in-part of U.S. patent application Ser. No. 09/288,020, filed Apr. 8, 1999 for ULTRASONIC IMPACT METHODS FOR TREATMENT OF WELDED STRUCTURES, now U.S. Pat. No. 6,338,765, which in turn is a continuation-in-part of U.S. patent application Ser. No. 09/145,992 filed Sep. 3, 1998, now U.S. Pat. No. 6,171,415.

FIELD OF INVENTION

This invention relates to the machining of rotatable braking surfaces and, more particularly, it relates to machining of cast iron brake drums and disk brake rotors by ultrasonically machining the braking surface with an ultrasonic tool having a set of freely moving impacting elements driven by an oscillating ultrasonic transducer.

BACKGROUND OF INVENTION

Braking surfaces, particularly those oriented on braking rotors, such as cast iron drums and disc brake rotors, have conventionally been tooled during primary manufacture by lathe cutting tools to present dimensioned machined surfaces having required tolerances. This manufacturing process produces in such braking rotors, in the form of brake discs or brake drums, a surface roughened with tooling marks and characterized by specific surface strength and hardness, a reformulated surface finish and tooling marks presenting a non-uniform stress profile and a source of tensile stress concentration. These tooling marks and tensile stresses limit the active service life of the braking surfaces thus encouraging fatigue cracks by heat checking and scuffing.

This problem has been addressed in U.S. Pat. No. 5,193,375, T. J. Meister, Mar. 16, 1993, entitled METHOD FOR ENHANCING THE WEAR PERFORMANCE AND LIFE CHARACTERISTICS OF A BRAKE DRUM and in U.S. Pat. No. 5,352,305, L. B. Hester, Oct. 4, 1994 and U.S. Pat. No. 5,664,648, L. B. Hester, Sep. 9, 1997, each entitled PRESTRESSED BRAKE DRUM OR ROTOR. These patents disclose a shot peening cold working method of treating the initially manufactured braking surface thereby inducing greater roughness in the braking surface. This peening creates a displacement of surface material about an impact point to establish a rim pattern of roughened peaks, to mask former tooling marks and tensile forces inherently introduced by the initial tooling procedure.

Objection can be taken to the roughened braking surface caused by peening. For example, such roughened braking surfaces require an intense burnishing process which develops heat checking when confronting the topography of brake pad surfaces thus encouraging heat checking hot spots which reduce the service life of the braking surface.

Furthermore, because of the nature of the product, particularly the confined and inaccessible interior braking surfaces of cast iron brake drums, it is physically difficult with peening methods to rework the braking surface areas without overlapping onto adjacent surfaces. Also precise and uniform control in the peening process to repeatedly meet different braking surface specifications is rarely feasible and practically impossible, thus leading to a low reliability of the peening method.

Proposed use of ultrasonic energy to restructure butt welded seams with an ultrasonic horn transducer directly in contact with the weld seam joining thin titanium sheets is taught by S. E. Jacke in U.S. Pat. No. 3,274,033, Sep. 20, 1966 for ULTRASONICS. However, the disclosed method and equipment would not be operable for processing the heavy cast iron structure used in brake drums and rotors, nor would it be able to process the sub-surface material to the depths needed for meeting braking surface specifications.

Furthermore, the ultrasonic treatment of welds requires a completely different relationship of ultrasonic impacts on the work body surface to strengthen welds. Rather, the processing of braking surfaces to achieve improvements of braking surface strength for the compressive interfacing between the braking surface and braking pads affects the work product in an entirely different way.

Prior ultrasonic impact treatment methods have been utilized for treating weld joints and fractures in structural iron, but it has not been known how to treat the topography and strength of braking surfaces ultrasonically to obtain greater strength and ability to perform the in-service role of compressively confronting brake pads.

Prior art brake drums are in general subject to thermo-mechanical fatigue, and propensity to develop cracks. The braking surfaces between drums and brake pads do not have appropriate shape and texture for service and thus need be subjected to extensive break-in procedures which themselves tend to produce cracking and thermo-induced stresses. The peening method of brake surface treatment leaves a roughened braking surface that reduces the amount of effective area of the braking surface in use, produces uneven distribution of individual peened peaks and contact area sizes to thus have the propensity to develop hot spots, thereby seriously limiting the maximum braking moment and contributing to early fatigue failures.

Further significant limitations of the peening method include the depth of allowable wear on the working surface and the uniformity of braking characteristics during the life of the brake drum.

One further limitation of the peening method is the inability to control the process to meet variable specifications. For example, the only control over braking surface roughness is the complicated matter of finding and implementing the appropriate shot sizes and accompanying striking forces. There is essentially no way to achieve a smooth cylindrical interface fit with an associated brake pad with the peening method.

Background technology for the application of ultrasonic impact energy to the surface of polypropylene and thermoplastic materials for welding or riveting, is evidenced by U.S. Pat. No. 5,976,314, Nov. 2, 1999 by Manfred Sans for DEVICE FOR ULTRASONIC TREATMENT OF WORKPIECES. However, this teaching does not disclose a feasible system for the reworking of machined metal work pieces by ultrasonic machining methods in a manner reworking the sub-surface crystalline structure and establishing the surface texture of a metal workpiece, as does this present invention.

Similarly, various specialty ultrasonic metal working impact transducers, including hand operated tools, are disclosed in the prior art for surface deformation and subsurface plasticization of explicit shapes and contours, typically cylinders, rotating surface segments and planar sheets by direct mechanical interfacing of an ultrasonically vibrating head with a metallic surface work site. Typical disclosures are found in Russian inventor's certificates including: SU 1447646 A1, published Dec. 30, 1988; SU 1263510 A2, published Oct. 15, 1986; SU 1756125 A1, published Aug. 23, 1992; SU 1255405 A1, published Sep. 7, 1986; SU 1576283 A, published Jul. 7, 1990; SU 998104, published Jan. 5, 1981; SU 1214396 A, published Feb. 28, 1986; SU 1481044 A, published Sep. 28, 1987; and SU 1703417 A1, published Jan. 7, 1982 relating to direct mechanical contact between an oscillating ultrasonic transducer head oscillating at the prescribed ultrasonic frequency and the treated metallic object surface.

French 2,662,180 filed May 7, 1991 relates to a system for applying ultrasonically oscillating thermal impulse energy to induce plastic surface deformation at weld sites to improve the initial weld strength in the plastic material. This system does not disclose how to successfully apply ultrasonic energy to correct braking problems by machining brake drum surfaces.

Statnikov, et al published documents IIW XIII-1617-96 and IIW XIII-1609-95 relating to the state of the art of hand held tools for applying ultrasonic impact energy directly from an oscillating transducer head at the impacting resonant frequency of the driving oscillator. These transducers are special purpose transducers with a single impacting needle adapted to a system configuration for achieving the particular functional treatment of strengthening welded structure of a specific workpiece configuration at a specific periodic ultrasonic resonant frequency.

Thus, this state of the ultrasonic transducer prior art will permit one skilled in the art to select and apply appropriate ultrasonic transducers for practicing this invention.

OBJECTS OF THE INVENTION

It is a general objective of the present invention to provide improved methods of machining metallic braking surfaces, typically cast iron by way of ultrasonic machining of the braking surfaces to restructure the surface strength and topography in a manner significantly increasing braking service strength and life.

It is a further object of the invention to overcome by ultrasonic machining methods the disadvantages of resident tooling marks on the braking surface, which produce tensile stress concentrations.

In general it is an object of this invention to process braking surfaces, typically cast iron brake drums, as a substantially final manufacturing step.

Another object of the invention is to machine the cylindrical interior drum braking surfaces with ultrasonic transducer assemblies which are small enough to be positioned inside the drum cylinder to establish precise working dimensions over braking surfaces that better mate with the drum confronting surfaces of the brake pads and which are confined to the braking surfaces only.

A more specific object of the invention is to plastically deform a braking surface by ultrasonic machining methods to increase contact area and strength of the braking surface metal and adjacent sub-surface region to a typical depth exceeding 500 microns and up to 3000 microns for meeting the designated wear depth tolerances of particular braking system surfaces.

Another objective of the invention is to develop improved smoothed braking surface topography on braking surfaces modified to remove roughened tooling marks which better conform with mating brake pads typically with macro-relief of less than 200 micro inch and a smoother finish micro-relief, thus advantageously providing a better surface for interfacing with the brake lining, better dissipation of heat build up, and increased surface contact for braking purposes.

It is another object of the invention to produce novel cast iron brake drums with ultrasonically processed modifications of the braking surface in the final manufacturing procedure therefore providing uniform distribution of residual deformations up to about 12 mm in depth, which deformations retain their distribution during life and afford greater braking strength.

Other objectives will be found throughout the following description, drawings, and claims.

BRIEF DESCRIPTION OF THE INVENTION

The above identified parent applications are incorporated herein in their entirety by reference.

The above objectives are achieved by employing novel ultrasonic machining methods as a final stage machining process in the manufacture of brake drums, in particular for removing former machine tooling marks. This results in novel braking surface re-manufacturing methods particularly related to cast iron surface structure of brake drums and brake rotors which produce designated smoothness of the braking surface configurations presenting greater brake surface contact area than obtainable by peening methods and thus producing much higher braking strengths.

To achieve these objectives, this invention introduces novel ultrasonic machining systems that uniquely machine braking surface structure to produce the desirable smooth rotor braking surfaces and strengthened braking surfaces which impart longer life braking service with increased braking forces.

Smooth braking surfaces are produced to facilitate mechanical abutment and engagement of the braking surface and its mating brake pads and thus provide more braking surface contact than the prior art peening-roughened surfaces.

These novel ultrasonic impact machining methods are interrelated and dependent upon ultrasonic tooling systems capable of working directly in the restricted access region of the drum brake internal cylindrical braking surface to precisely attain and repeatedly meet brake surface specifications over the entire braking surface in an efficient and low cost manner.

Thus, an ultrasonic transducer head adapted for efficient transfer of oscillating ultrasonic energy at frequencies up to 55 kHz from an ultrasonic periodically vibrating energy transfer surface is employed. A set of freely axially movable impacting elements is interposed between a transducer energy transfer surface and the braking surface being machined in a braking surface scanning mode to uniformly cover the entire braking surface.

A scanning system employing a lathe unit positions the transducer and impact members inside the cylindrical brake drum for ultrasonically impacting only the exposed braking surface without machining any other exposed surfaces as is required by the nature of the prior art peening methods. Thus the set of transducer driven indenter members scan the braking surface as the brake drum and transducer impact members are relatively rotated therewith to establish a substantially uniformly machined braking surface.

This novel mode of operation is thus advantageous over the former peening methods which by nature impact areas outside of the braking surface thereby dissipating available kinetic energy per unit of braking surface area. By producing smoother controlled braking surface macro and micro surface structure provides a much larger braking impact area to achieve plastic deformation and result in a higher braking strength of the cast iron braking surface. The prior art peening mode of operation serves to indent and reshape the impact area into the peaks and valleys of roughened surface texture which eliminates braking surface contact over a substantial portion of the braking surface.

The ultrasonic impact machining methods of this invention with associated ultrasonic systems features therefore produce a superior higher strength machining of the braking drum or rotor to present smoothed surfaces to accommodate specified braking system requirements and to provide higher braking forces in service with a larger mating surface interfacing with a brake pad in dry sliding contact with increased braking forces to effect frictional loading over a longer life of braking service.

The braking surface is plastically modified by the ultrasonic methods applied with the ultrasonic transducer to achieve a two-component surface texture with macro and micro components, and to strengthen the surface material, typically cast iron, beyond the yield strength and approaching the ultimate strength of the base material, thereby creating internally in adjacent sub-surface regions a normalized deflection mode of the material in the brake drum body realized by balancing of internal forces. Employment of an associated set of simultaneously oscillating indenters in the transducer head produces the novel characteristics of a smoother more uniform interfacing surface machined on the drum during a scanning operation.

Other features and advantages of the invention will be found throughout the following drawings, description and claims.

BRIEF DESCRIPTION OF THE DRAWINGS

In the accompanying drawings, similar reference characters found in the several views represent similar features to facilitate comparison.

DESCRIPTION OF PRESENTLY PREFERRED EMBODIMENTS

This invention in general introduces novel methods and equipment for machining metallic cast iron brake rotors and brake drums with ultrasonic machining methods for significantly increasing the braking surface available for braking service. In this process, braking surfaces and the adjacent sub-surface regions are plastically altered to remove tooling marks and produce an interfacing surface of specified macro and micro smoothness features better mating with an associated brake pad.

Figure 1:
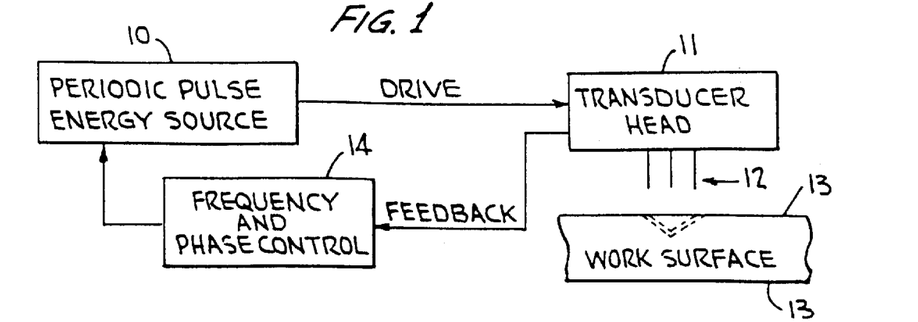
FIG. 1 is a block circuit diagram of the ultrasonic braking surface machining system afforded by this invention.

With reference to FIG. 1 of the drawings, this block system diagram identifies the ultrasonic impact operating system for treating rotary braking surfaces at work surface 13, from ultrasonically movable impacting members 12 presenting a set of several, typically three or four, spaced members for impacting the work surface 13 under control of the ultrasonic transducer head 11. The periodic pulse energy source 10, typically operable at ultrasonic frequencies up to 55 kHz drives the transducer head 11, preferably subject to feedback frequency and phase control 14 processing feedback from the working transducer head 11 to aid in matching resonance characteristics of the head when working on the work surface 13, as set forth for example in more detail in the parent applications.

Figure 2:
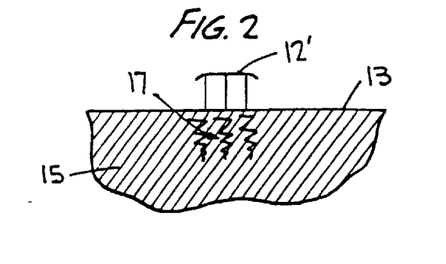
FIG. 2 is a diagrammatic sketch of the manner of inducing forces and deformations by ultrasonic machining of a working braking surface and immediate sub-surface region in response to a set of three impacting elements.

In FIG. 2, the set of impacting elements 12', as driven by the transducer head 11, ultrasonically plastically deforms as part of the machining process the surface 13 and the accompanying subsurface region 17 of a work body 15, typically a cast iron drum with an internally disposed cylindrical braking surface 13. The plastic deformations are induced on the brake drum surface and adjacent sub-surface body areas 17 permitting favorable stresses to compensate for tension stresses incurred during braking. The sub-surface effect is diagrammatically shown at 17 with separate working regions for the three impacting elements illustrated for the set 12', as deformation patterns, which are merged over the entire braking surface by appropriate scanning of the transducer across the braking surface, thereby changing the nature of the material to an appropriate depth into the material being machined and forming a uniform pattern over the entire thus machined braking interface surface of the braking drum.

Figure 5:
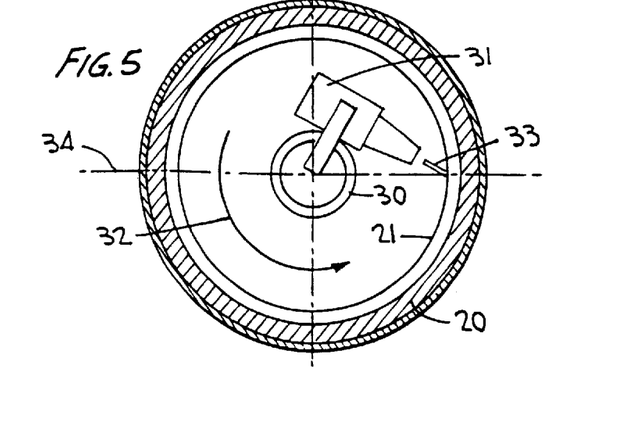
FIG. 5 is a diagrammatic cross section view of the cylindrical braking region of a cast iron brake drum and associated transducer scanning system employed in the novel ultrasonic machining process afforded by this invention.

This invention employs ultrasonic frequencies up to 55 kHz with relative scanning of the impacting indenter elements in set 12' about the work surface 13 by means of an appropriate scanning system, as more specifically set forth in the parent applications and in FIG. 5. The depth of the sub-surface plastic deformation is in a typical case 500 microns or more as established by the tolerances of manufacturing of this braking interface surface. The resulting hardness of the braking surface is not lower than a factor of 1.2 of the unprocessed drum material harness with substantially uniform deformations induced over the braking interface surface areas. This serves to form strengthened surface layers presenting on outer smoothed plastically deformed surface structure that machines the resident tooling marks.

Figure 3:
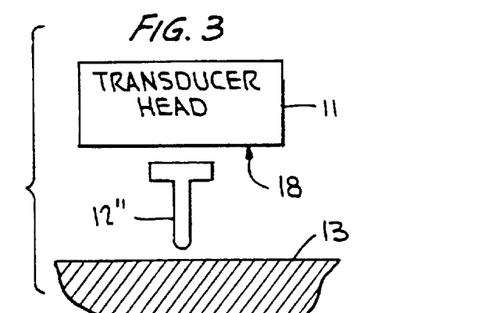
FIG. 3 is a diagrammatic sketch illustrating generation of randomly spaced ultrasonic impacts from a free flying impact member obtaining one sided impact driving energy by abutment with an ultrasonic transducer head which drives it as a freely moving object into a working surface.

For achieving excellent transducer 11 to surface 13 energy transfer and to randomize the impacts on the surface 13, the mode of operation characterized by the diagrammatic view of FIG. 3 comprises a preferred embodiment of the invention. Thus, the free flying impact member 12" by abutting the transducer head 11 impact surface 18 is periodically forced toward the work surface 13 as a free flying member to serve its kinetic energy released upon impact to achieve the desired machining by elastic deformation of the plasticized braking surface material being worked, typically cast iron.

The ultrasonic machining method of this invention provides the unprecedented opportunity to precisely regulate and adjust parameters by way of selection of frequencies (typically up to 55 kHz) and amplitude of oscillation (typically up to 50 microns) by control of the ultrasonic transducer input power (typically greater than 300 watt/$cm^2$), as well as control of the sizes of the indenters (typically up to 1.5 kg in weight). Also, the pressure of the transducer upon the braking surface up to 50 kg is selectable. The proper choice of these variables of course depend upon the specifications required by the drum and braking surface being machined. The creation of plastic deformation on the working surface of the drum is realized by the frequency and duty cycles of the impacting elements, the simultaneous pressure of the tool upon the braking surface, inclination of the impact members upon the braking surface, and the scanning speed of the transducer across the braking surface. This gives an opportunity to achieve a given degree of plastic deformation beyond the yield strength and up to the ultimate strength of the drum material, typically cast iron.

This achievement of a given degree of plastic deformation forms a distributed stress field counterbalanced in the volume of the brake drum of favorable residual stresses for cancellation of variable stresses incurred in service tending to cause thermo-mechanical fatigue of the drum during its operation.

Additionally, the opportunity to fashion the surface texture of the braking surface simultaneously in the machining process to establish given macro and micro roughness characteristics is afforded by this invention. Typical macro roughnesses up to 200 MCI and micro roughness up to 75 MCI permit the drum braking surface to better mate with the braking pads for efficient delivery of higher compressive braking forces in service.

A damping spring with rigidity up to 3 kg/mm and a set of indenters with a hardness of their working surface not less than 60 units working in a transducer assembly producing a mechanical Q-factor of a material of the indenters not less than 800 and a wavelength of no more than 0.2 lengths of a wavelength in the material of the indenter at the operating frequency of the ultrasonic oscillator comprises typical operational characteristics for a system such as afforded by this invention.

All these consolidated features impact a transducer head assembly of a size that comfortably fits commercial brake drum cylinders to thus permit simplified scanning by a lathe mechanism at readily controllable scanning speeds.

Figure 4:
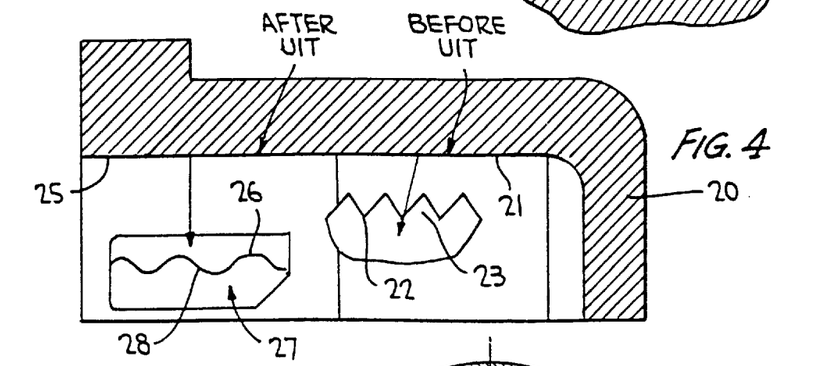
FIG. 4 is a fragmental diagrammatic representation looking into a section of a brake drum showing by the insets the comparative characteristics of the braking surface before and after ultrasonic impact machining.

FIG. 4 diagrammatically depicts a fragmental section view of a brake drum 20 in the process of ultrasonic impact machining. These drums 20 in the preceding conventional manufacturing process are machined at the interior cylindrical surface 21 by a lathe to within acceptable dimensional working tolerances for interfacing at 28 with brake shoes. However, that procedure results in a jagged edged finish from the residual tooling marks 22 shown as teeth in the enlarged insert sample 23. In this initial machining process, two significant braking disadvantages are introduced, namely (a) the roughened spiral lathe tool screw-thread-like indentation pattern 22, typically of a magnitude of 5 to 12 microns, as shown in the enlarged scale insert 23, and (b) residual tension stresses at the braking interface surface 21. These deficiencies reduce the length of life in operation without fatigue failure and result in hot spots, scuffing and the tendency for the brake pads to migrate to the rear in the brake drum cylinder.

These tooling marks are eliminated by this invention and smoothed surfaces are achieved by ultrasonic impact machining of the drum surface in the processing step of producing a finished braking surface 25, primarily exhibiting a smoothed and hardened surface material of strength greater than the yield point and up to the maximum strength of the cast iron brake surface material. The physically deformed interfacing surface 26, shown in the enlarged insert accenting the enlarged interface surface 22 for engaging brake pad 27, having the disadvantages of presenting undesirable tensile stresses under braking conditions, and presenting spiral type screw threads that under braking pressures cause a migration of the brake shoe towards the rear of the drum. Thus, this invention has significantly reduced the micro pattern of lathe markings 22 to a maximal roughness of less than 75 micro inch, thereby creating an interface surface with the brake pads at 28 having the tooling marks 22 essentially removed and replaced by a smoothed and strengthened interface macro surface 28 of less than 200 micro inch of selected micro and macro surface texture interposed between the brake drum interface braking surface 25 and the brake pad 27, typically presenting surface roughness extending to a depth of no more than 1.85 microns.

Figure 7A:
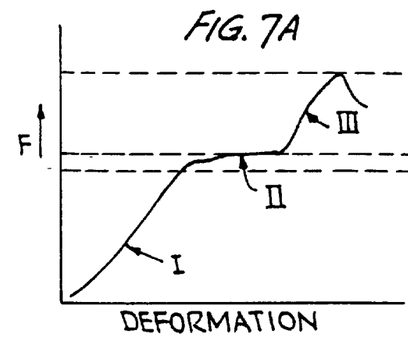
FIG. 7A is a diagrammatic representation of a typical stress-strain curve for material under stress.

With reference to FIG. 7A, the classical stress-strain curve for the cast iron working material is illustrated with stress force F indicated on the vertical axis and deformation indicated on the horizontal axis. The curve represents three zones of deformation (I, II, and III) that are pertinent to the machining and service operation of the braking surface. This ultrasonic machining process imparts deformation to the surface at the zone closest to the ultimate strength of the material, typically cast iron, which is depicted as zone III on the curve.

Figure 7B:
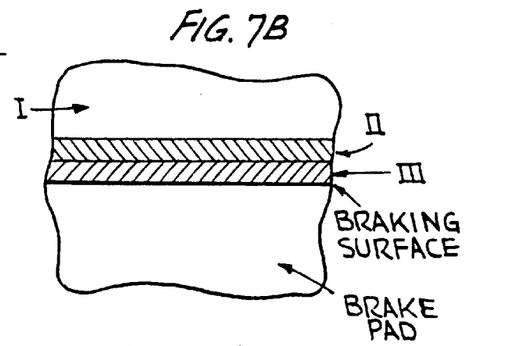
FIG. 7B is a diagrammatic representation of the various levels of deformation introduced into the braking surface as a result of ultrasonic machining by this invention and its application during the braking operation.

FIG. 7B represents the various levels of deformation within the braking surface as a result of the ultrasonic impact machining process of this invention as relates to the contact surface area with the brake pad. The contact surface area that is placed under load at the time of braking in contact with the brake pad is a surface layer of high strength material close to the ultimate strength of the base material. Beneath this protective high strength layer of material is a layer of compressive strength material at its yield point categorized as deformation zone II in FIG. 7A.

Figure 7C:
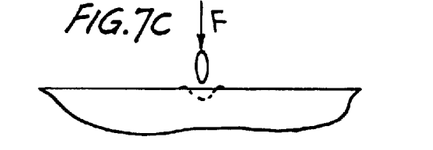
FIG. 7C diagrammatically depicts the process of the impacting needle elements on the braking surface during the machining process of this invention.
Figure 7D:
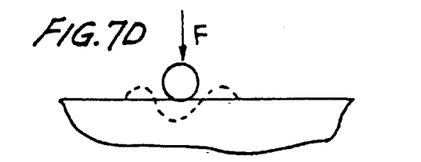
FIG. 7D diagrammatically comparatively depicts the prior art process of impacting peening balls on the braking surface.

Thus, as diagrammatically set forth in FIG. 7B, a force is applied in the maximum material strength zone III during application of the brake pad on the braking surface. To achieve this result, as depicted in FIG. 7C, a small area impacting needle element striking and compressing the braking surface at a high velocity is employed in the ultrasonic impact machining methods introduced by this invention. The prior art peening method of impact, as represented in FIG. 7D, uses a lower velocity, larger-area peening ball, deforms the surface into a crater and displaces the braking surface metal into a surrounding ridge ring to thereby roughen the braking surface with a maximum force in the yield point zone II as depicted in FIG. 7A. The action of the peening ball does not allow for control at the point of impact. In many cases the shot peened balls are deflected during their travel from the desired trajectory by other balls ricocheting from the surface at time of treatment. This prevents control of the actual impact intensity. The nature of the peening process only provides for a single-component surface texture.

Now, with reference to the deformation characteristics of FIG. 7A, the first plateau is formed when reworking forces reach the maximum level as the zone II fluidity of material forms plastic indentations of the material.

Contrast that with the zone III area where the ultrasonic impact machining method of this invention introduces deformation on the brake surface layer resulting in a strengthened material at a point close to the range 0.9 to 0.95 of the maximum cast iron material strength to achieve a substantial improvement in braking surface performance. The depth of this surface layer extends to a depth of the order of 12 mm thus to include the limits of braking wear depth. When applied by scanning the entire braking surface with the impact needles, this improved method assures a braking performance as illustrated in FIG. 7B. The prior art methods of surface treatment forming areas of plastic deformation only extend to depths of about 2 to 3 mm and therefore cannot significantly improve braking wear life.

The ultrasonic impact machining methods of the invention thus enhance frictional wear properties, performance and life of rotary braking surfaces, particularly the interior cylindrical cast iron brake drum surfaces, which can be readily machined by transducer driven impacting elements and machining systems afforded by this invention. The ultrasonic impact energy is applied at an intensity level sufficient to induce a surface and sub-surface deformation pattern that produces increased strength in the surface layer and balanced distribution of forces in the volume of the material that together with the smoothed braking surface increases resistance of the drum to scuffing and heat checking under conditions of dry sliding contact and frictional loading.

Figure 8A:
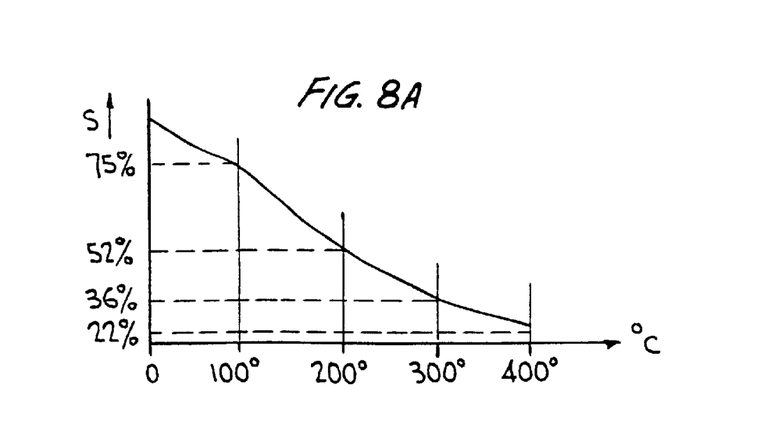
FIG. 8A diagrammatically explains the effect on the material strength during work under different temperatures.

The FIG. 8A strength-strain diagram represents the dependence of the plastic zone upon temperature for cast iron braking components when loaded during braking work. The material yield point S for different temperatures are shown on the curve. Thus, at 100 degrees C, the yield point of the working material decreases to 75% of the material yield point at ambient temperature (20° C.).

Figure 8B:
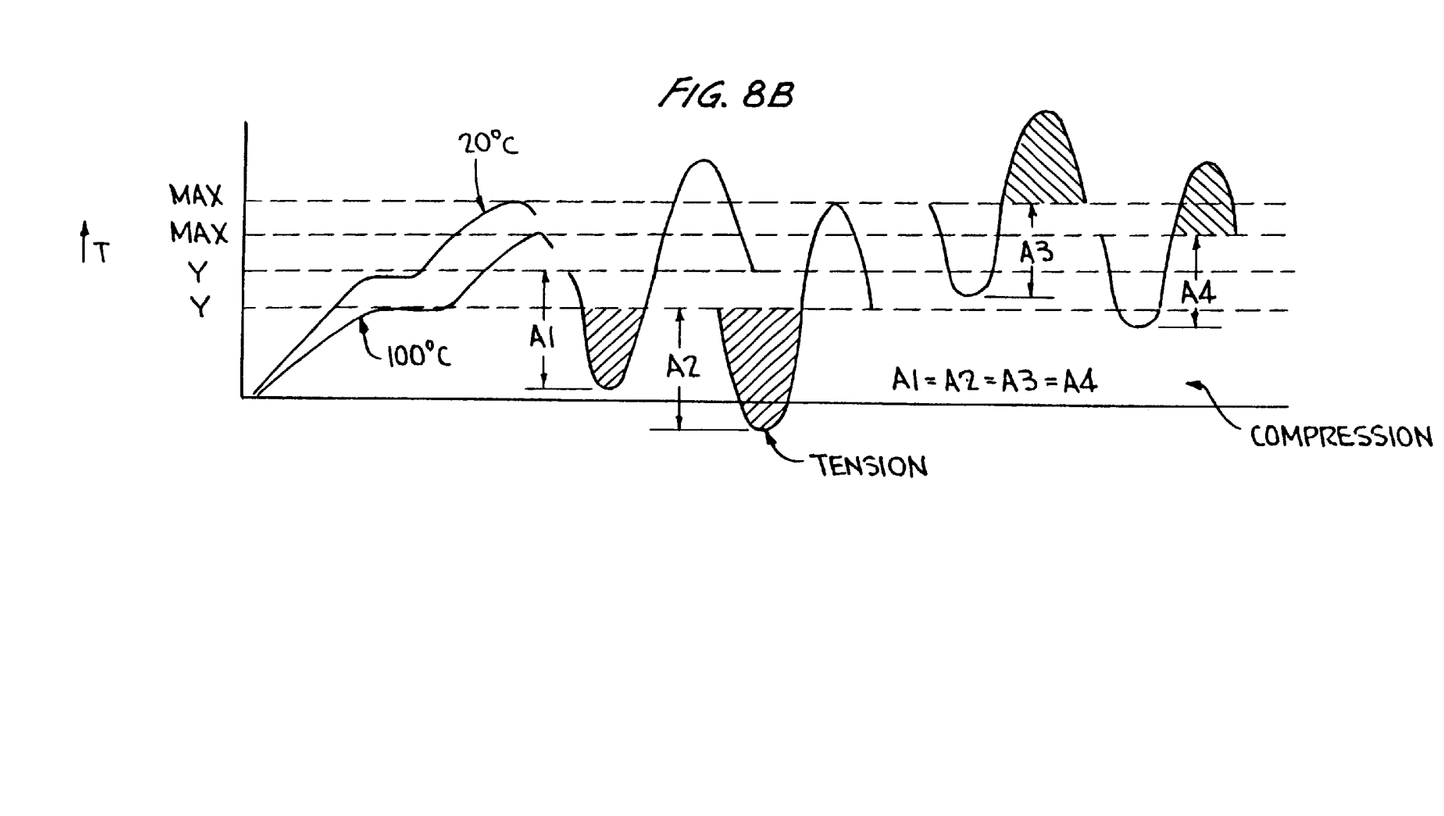
FIG. 8B diagrammatically explains the effects of the surface layer to temperature during brake operation represented for various braking cycle conditions.

This invention permits the hardening of the braking surfaces to provide braking compression in service approaching the maximum material strength as displayed in zone III, as will be shown by reference to FIG. 8B, in consideration of the hatched portions of the typical applied working force cycles A3 and A4. The working force amplitudes A1 to A4 are equal.

As seen by reference to the upper and lower deformation curves of FIG. 8B, the lower the temperature, the higher the maximum strength of the working material consistent with the information presented in FIG. 8A. It is the objective of this invention to operate at temperatures and with braking forces that work the material in the compression zone (above the horizontal coordinate) while avoiding any incursions into the tension zone below the horizontal coordinate as encountered in working cycle A2.

As represented by the cycles A1 and A2, showing their lower halves hatched, the working energy is applied to cycle about the yield points Y of the respective deformation curves. This may lead to the application of tension forces to the working material as represented by the A2 portion below the abscissa for a higher temperature work object.

During braking operation, the temperature of the brake surface is elevated, thus resulting in different physical properties for the behavior of the metal under deformation. This is demonstrated by the different curves as shown in FIG. 8B.

This invention results in a braking surface material layer of deformation close to the ultimate strength of the base cast iron material. This provides a working cyclic force when the brake component is subject to work loads represented by the A3 and A4 working cycles. Thus, the working brake component is not subjected to tension forces as would be the case if the surface layer material strength was not at the ultimate strength of the base material but at its yield point as depicted by working cycles A1 and A2. By nature of the peening application referenced in the prior art, the maximum strength attainable by these processes is the yield point of the material in contrast to the benefits derived as a result of the stronger surface layer achieved by this invention at the ultimate strength of the base cast iron material.

Accordingly, this invention provides a braking surface with better abutment and engagement between the braking surface and the mating brake pad. Accordingly, the methods provided by the present invention eliminates damages of heat checking and scuffing characterized by roughened surface contact incurred in the prior art peening process. Also, the smoothed surface presents a strengthened surface layer that provides increased contact with the brake pad and thus improved braking strength accompanied by greater frictional sliding resistance in the braking operation and significant decrease of fatigue, assuring longer service life. The ultrasonic impact machining methods of this invention alters the cast iron material stress distribution pattern by introducing plastic deformation at the surface resulting in a material with braking strength up to the yield point of the cast iron brake drum material.

This method of treatment therefore is a significant improvement over the ball peening treatment of the braking surfaces proposed by the aforementioned U.S. patents, which must create a braking surface roughness of 200 to 500 microns resulting in a finished surface substantially rougher than the original tooling marks.

This invention therefore introduces the improved machining method of employing ultrasonic oscillation treatment as a final stage in the manufacturing process for machining cast iron brake drum braking surfaces to be frictionally engaged with brake pads thereby enhancing braking strength, safety and service life. Thus, machined braking surfaces that present tooling marks and exhibit residual roughness patterns and surface tensile stresses are machined with ultrasonic oscillations developed in an ultrasonic transducer for contacting the braking surface from a set of ultrasonically oscillating indenters serving as plasticizing means for the braking surface and adjacent sub-surface areas scanned by the set of indenter elements to produce a uniform braking surface pattern over the entire braking surface while avoiding adjacent non-braking surface regions.

This ultrasonic energy machining method for brake surfaces thus effects surface and sub-surface elastic and plastic deformations resulting in replacement of the tooling marks and replacement of the initial machined surface with a significantly stronger and smoother surface selectively controlled to meet braking drum specifications. This produces at the braking interface surface a surface structural shape having superior smoothness and frictional abutment properties for engagement of brake pad friction surfaces thereby to decrease scuffing and heat checking under conditions of dry sliding contact and frictional loading with brake pad surfaces, thus extending contact friction life. The modification to the properties of the material in the outer layer of the surface provides a long life layer compressed and hardened up to the base material's maximum strength region to present higher wear resistance surface than before achieved in the prior art to achieve better braking performance and longer fatigue life of the ultrasonically machined brake drum.

The treated braking surfaces are typically exhibited on a rotatable surface, such as brake drums and brake rotors, and the treatment is achieved in the operational step of controlled application of ultrasonic impact energy on the previously machined braking surface as applied by an ultrasonic transducer coupled to a set of several working indenters for contacting, scanning and machining the surface to produce a superior and consistent wear surface over the entire braking interface surface region of a strength greater than the yield point and approaching the ultimate strength of the base material of the braking component.

When the braking surfaces are exhibited on a cast iron brake drum interior circumferential surface, the impact tool is attached to a lathe unit positioned inside the drum cylinder to contact the several concurrently working ultrasonically driven indenters with the braking interface surface presented on the drum interior circumferential surface, as discussed below in more detail with reference to FIG. 5 illustrating the impact tool indenter set resident during the ultrasonic impacting treatment upon the interior circumferential surface while being relatively rotated by a lathe. In this operation the impact treatment on the brake drum surface is preferably confined to the braking surfaces without expending unnecessary energy to impact further exposed internal surfaces of the brake drum other than the interfacing braking surface. The resulting braking surfaces 25 exhibited on a cast iron brake drum interior circumferential surface after the ultrasonic impact machining results in a plastically deformed structural shape presenting an average roughness not greater than 75 micro-inches.

Figure 6:
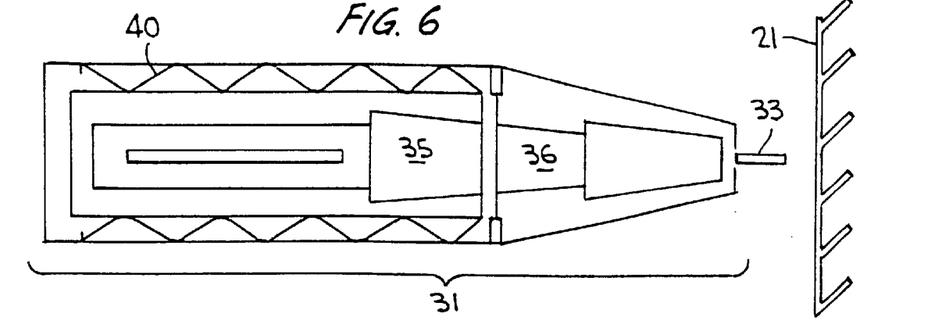
FIG. 6 is a diagrammatic representation of a cross sectional view of the ultrasonic transducer system afforded by this invention for reworking braking surfaces on the interior cylindrical surface of a cast iron braking drum.

The oscillating amplitude of the transducer impelled indenters is between 15 and 50 microns. The impact indenter set is operated at a duty cycle of impacting indenter members at not more than 25% of the operating time of the ultrasonic head. The random pulses are preferably obtained in the mode illustrated in FIG. 3 with the transducer operating at a resonant oscillation frequency of up to 55 kHz. The transducer drives a mass of impact tool elements between 1.5 g and 20 g at an oscillating amplitude of not less than 15 microns. This impact tool indenter structure is pressed against the working surface with an adjustable force up to 50 kg permitting discharge of the indenter kinetic energy to introduce plastic deformation of the metallic braking material to effect changes of the treated surface and its adjacent sub-surface to produce the desired plastically deformed and strengthened braking contact surface structure. The impact tool is resiliently pressed against the working surface during the impact process by a resilient spiral spring member 40 as shown in FIG. 6.

A significant advantage of the ultrasonic impact machining method of this invention is that the precise regulation of the applied impact energy is readily adjustable by control of the frequency and oscillating energy of the transducer, the choice of impacting element duty cycle, and the oscillating amplitude and weight of the impact members.

As described in more detail below with reference to FIG. 5, the impact element 33 is positioned to strike the working surface with the indenter disposed at an angle to the normal of sufficient magnitude to maintain indenter vibration stability and prevent withdrawal of the tool from the working surface at a specified tool travel speed along the working surface. In this respect, for a preferred embodiment, the working angle is in the range of 15 to 25 degrees with an accompanying travel speed of relative movement of the tool and work surface established in the range of 150 to 250 RPM as effected with a vertical boring and turning lathe while the transducer is driven with sufficient ultrasonic energy to achieve a plastically deformed surface with a surface roughness not greater than 75 micro-inches. An oscillation amplitude is produced at the work surface ranging from between 0 and 100 microns. The spiral spring 40 (FIG. 6) serves as an impacting element damping member presenting an axial damping force up to 50 kg with the rate of 1 kg/mm.

In FIG. 5, the lathe attachment 30 is installed inside the drum 20 carrying the transducer attachment 31. The drum 20 is relatively rotated with respect to the transducer with the set of indenters positioned at an angle of approximately 19 degrees from the normal 34 to the braking surface 21. This ultrasonic impact tool system treats and re-processes with ultrasonic impact energy the entire braking surface, namely the metallic cast iron previously machined frictional braking surface 21 of the braking rotor. In the embodiment shown, the previously machined inner cylindrical brake drum surface having specific machine tool marks, roughness and residual tensile stresses is machined by the ultrasonic impact machining methods introduced by this invention.

The impacting tool 31 as shown in FIG. 6 comprises as an example an ultrasonic magnetostrictive transducer 35 with an energy concentrator 36, which abuts the free flying indenters in a set 33 in the manner shown in FIG. 3 to ultrasonically impact the previously machined and roughened braking surface 21. This induces braking surface modification by compressing a surface layer thus strengthening the surface material to exceed the yield point of base material to therefore produce a surface compression strength during braking that exceeds the yield point of the brake drum material and approaches its ultimate strength. In addition the topography at the surface is smoothed in its plastic state as the set of impacting elements is scanned over the braking surface to replace the tool marked surface structure with a smoothed frictional abutment surface structure presenting micro and macro surface structure with superior properties for engagement with brake pad frictional surfaces under conditions of dry sliding contact with and frictional loading by brake pad surfaces.

The preferred surface scanning system of the FIG. 5 embodiment forces the set of indenters 33 into the machined frictional surface 21 in a scanning mode covering the entire braking surface on the interior cylindrical drum surface 21 by relative movement 32 between the indenters 33 and the machined frictional contact surface 21 of the braking rotor comprises the lathe system 30, a vertical boring and turning machine, which employs the rotary lathe unit 30 to position and scan the ultrasonic transducer 31 and associated indenters 33 in precise alignment with braking surface 21 to produce ultrasonic impact energy at the braking surface 21 of the drum body 20 resulting in plastic deformation and strengthening of the surface.

In the ultrasonic tool system, the impacting tool, namely ultrasonic transducer 31, further comprises a tuned damper having the natural frequency in the frequency range up to 3 kHz operating with a set of indenters having natural resonance frequencies up to 300 kHz. The resonant mechanical frequencies of the ultrasonic transducer drive elements 35, 36 and 33 are tuned to produce a mechanical Q-factor of not less than 800, with the wavelength in the material of the indenter at the operating frequency of the ultrasonic transducer being no more than 0.2 lengths of a wavelength of the elements 35 and 36. The impacting tool 31 is pressed against the working surface 21 with adjustable force up to 50 kg to insure a shaping force when the braking surface is molten to achieve a specified degree and uniformity of plastic deformation of the surface and sub-surface layers. The spiral spring 40 provides an axial damping force up to 50 kg with the rate of 1 kg/mm.

The invention thus provides an improved metallic braking drum having a braking surface adapted to engage a brake pad in dry sliding contact and frictional loading characterized in that the initial manufacturing process tensile stresses and tooling mark indentations in the braking surface are removed by ultrasonic machining. This machined braking drum presents during the ultrasonic machining of this invention a plastically deformed braking surface topography and creation of an improved sub-surface layer resulting in a significantly reduced magnitude of braking surface tooling indentations and significantly increased braking compression strength. Introduction of ultrasonic oscillations is achieved at high enough intensity to improve the adjacent sub-surface regions of the base drum material, typically cast iron, at the surface and to a depth of at least 500 microns while creating a uniform stress profile across the braking surface with a surface texture profile for improving the interfacing between the braking surface and brake pad thus increasing working life.

Thus, novel improvements are introduced by this invention into the braking arts by application of ultrasonic impact energy to effectively transfer energy to the surface and sub-surface layers of the drum material for plastically transforming the critical braking surface structure to a stronger and smoother surface for interfacing braking pads. The properties of the adjacent sub-surface regions are reconfigured to a depth of at least 500 microns, while the ultrasonic transducer is scanned to present a uniform stress profile across the braking surface.

Those novel features descriptive of the nature and spirit of the invention are set forth with particularity in the appended claims. As will be apparent to one skilled in the art, various modifications can be made within the scope of the aforesaid description. Such modifications being within the ability of one skilled in the art form a part of the present invention as embraced in these claims.

It is claimed:

1. A method of machining a braking surface to be frictionally engaged with a brake pad for enhancing braking strength and length of service life by ultrasonic oscillations applied to rework a previously machined braking surface presenting a working surface having tooling marks and exhibiting tensile stress, comprising the steps of: impacting said machined braking surface with ultrasonic oscillations developed in a coordinated set of individual impacting elements ultrasonically driven by an ultrasonic transducer to induce on and beneath said work surface a modified work surface layer thus smoothing and hardening the braking surface to produce a longer wearing and stronger braking surface, said oscillations being of sufficient intensity to effect removal of the tooling marks thereby producing at said braking surface a smoothed plastic deformation surface having frictional abutment properties for engagement with a brake pad while reducing scuffing and heat checking under conditions of dry sliding contact and frictional loading with a surface of the brake pad and presenting a strengthened braking surface thus extending operating life of the braking surface.

2. The method of claim 1 wherein said machined braking surface is upon a rotatable surface, comprising the steps of subjecting the rotatable surface to controlled application of ultrasonic oscillation energy applied to machine the braking surface by ultrasonic transducer means driving a set of individual oscillating indenters into contact with the braking surface, and relatively scanning the transducer means and rotatable surface to uniformly establish a deformed braking surface.

3. The method of claim 2, wherein said braking surface is a cast iron brake drum interior circumferential surface, and said transducer means is attached to a lathe unit positioned inside the drum to contact said set of indenters with the braking surface, and wherein said indenters and the interior circumferential surface are relatively rotated by said lathe unit.

4. The method of claim 2 wherein the impacting elements of said set are positioned to contact an interior surface of said braking surface at an angle to normal of a magnitude maintaining indenter vibration stability and preventing withdrawal of the tool from the work surface at a specified tool travel speed along the work surface during rotation.

5. The method of claim 4, wherein said angle is substantially 19 degrees and a travel speed of relative movement of the tool and the work surface is about 190 RPM as effected with a vertical boring and turning lathe.

6. The method of claim 1 wherein said plastic deformation results in an ultrasonically machined braking surface presenting an average surface roughness not greater than 200 micro-inches.

7. The method of claim 1 wherein said impacting elements have an oscillating amplitude between 10 and 50 microns.

8. The method of claim 1 further comprising the step of driving the impacting elements into the braking surface at a duty cycle of not more than 25% of operating time of the ultrasonic transducer.

9. The method of claim 1 further comprising the step of operating the ultrasonically driven impacting elements at a resonant oscillation frequency of up to 100 kHz.

10. The method of claim 1 wherein the impacting elements have a mass between 1.5 g and 20 g.

11. The method of claim 1 further comprising pressing the impacting tool impacting elements against the work surface with an adjustable force above 0 and up to 50 kg with an oscillation amplitude sufficient for uniformly introducing plastic deformation of the braking surface and adjacent sub-surface region to produce a smoothed braking contact surface structure.

12. The method of claim 1 including the step of resiliently pressing the impacting tool indenter elements against the work surface by a resilient member disposed in the ultrasonic transducer.

13. The method of claim 1 wherein the ultrasonic impact energy applied to said work surface provides by plastic deformation a surface roughness not greater than 200 micro-inches.

14. The method of claim 1 wherein the impacting elements present an oscillation amplitude at the work surface ranging from between 0 and 100 microns.

15. The method of claim 1 further comprising the step of moving the impacting elements in the set freely in random axial motion between an oscillating surface on said ultrasonic transducer and the braking surface.

16. The method of claim 1 further comprising the step of driving the impacting elements into said braking surface at a velocity high enough to exceed the yield point of the braking surface thereby to compress a layer on the braking surface.

17. An ultrasonic impact machining method of machining a braking surface adapted to frictionally contact a brake shoe, said braking surface initially presenting tooling marks exhibiting residual roughness patterns and surface tensile stresses, comprising the steps of: generating surface and subsurface plastic deformation of a work surface on the braking surface from ultrasonic oscillation energy to produce a modified smoothed braking surface having frictional abutment properties upon engagement with a brake pad friction surface thereby to reduce scuffing and heat checking under conditions of dry sliding contact and frictional loading upon braking contact with a brake pad and machining said braking surface with a set of ultrasonically vibrated indenter needles disposed to freely axially move in response to impact by an ultrasonic transducer so that the individual indenter needles of the set strike the braking surface and rebound in a random pattern.

18. The method of claim 17 further comprising the step of machining the braking surface at ambient temperature.

19. The method of claim 17 further comprising the step of generating a compressed braking surface deformation that increases the braking strength capability of the braking surface.

* * * * *

UNITED STATES PATENT AND TRADEMARK OFFICE
CERTIFICATE OF CORRECTION

PATENT NO. : 6,458,225 B1
DATED : October 1, 2002
INVENTOR(S) : Efim S. Statnikov It is certified that error appears in the above-identified patent and that said Letters Patent is hereby corrected as shown below:

<u>Title page,</u>
Item [73], Assignee: "Uit, L.L.C. Company" should read -- UIT, L.L.C. Company --.

Signed and Sealed this

Twenty-eighth Day of January, 2003

JAMES E. ROGAN
*Director of the United States Patent and Trademark Office*